US006322376B1

(12) United States Patent
Jetton

(10) Patent No.: US 6,322,376 B1
(45) Date of Patent: Nov. 27, 2001

(54) STUD BOLT HOLDER FOR A POWER DISTRIBUTION BOX

(75) Inventor: James Thomas Jetton, Ann Arbor, MI (US)

(73) Assignee: Yazaki North America

( * ) Notice: Subject to any disclaimer, the term of this patent is extended or adjusted under 35 U.S.C. 154(b) by 0 days.

(21) Appl. No.: 09/539,937

(22) Filed: Mar. 31, 2000

(51) Int. Cl.[7] .............................. H01R 12/00; H01R 4/66; H01R 11/09; F16B 39/00

(52) U.S. Cl. .............................. 439/76.2; 439/92; 439/723; 411/107

(58) Field of Search .............................. 411/84, 107, 85, 411/970, 999; 439/76.2, 92, 212, 813, 721, 722, 723, 724

(56) References Cited

U.S. PATENT DOCUMENTS

| | | | | |
|---|---|---|---|---|
| 2,972,367 | * | 2/1961 | Wootton | 411/107 |
| 4,056,301 | * | 11/1977 | Norden | 439/724 |
| 4,500,240 | | 2/1985 | Moran et al. . | |
| 5,088,940 | | 2/1992 | Saito . | |
| 5,302,070 | | 4/1994 | Kameyama et al. . | |
| 5,423,647 | | 6/1995 | Suzuki . | |
| 5,795,193 | | 8/1998 | Yang . | |

FOREIGN PATENT DOCUMENTS

1500941 * 1/1970 (DE) .

* cited by examiner

*Primary Examiner*—P. Austin Bradley
*Assistant Examiner*—James Harvey
(74) *Attorney, Agent, or Firm*—Young & Basile

(57) ABSTRACT

The invention is a removable bolt holder for securing a terminal bolt to a power distribution box housing with the bolt positioned to accept a battery terminal and to secure the battery terminal to a bus bar, for example with a nut. The bolt holder is formed separately from the housing, preferably of a material which is more heat-resistant than the material of the housing. The bolt holder is provided with locking structure which allows a first bolt to be inserted shank first into a terminal engaging position, and which further allows a replacement bolt head to be inserted to release the locking connection with the first-inserted bolt. If the bolt is stripped or fractured during assembly the bolt can be removed from the holder without removing the holder from the housing. If the holder is damaged, the entire holder can be removed from the housing.

12 Claims, 4 Drawing Sheets

STUD BOLT HOLDER FOR A POWER DISTRIBUTION BOX

FIELD OF THE INVENTION

This invention is in the field of stud bolt terminal connections in the power distribution box of automotive vehicles.

BACKGROUND OF THE INVENTION

An electrical junction block or power distribution box is used in automotive vehicles to streamline wiring by eliminating multi-branch wiring. The power distribution box consolidates branch circuits and fuses, typically by incorporating bus bars into a housing to connect vehicle battery power to various electrical components serving the vehicle. The power distribution box often uses a stud bolt to connect a vehicle battery terminal to the bus bar.

In one type of conventional power distribution box, the stud bolt is molded into the plastic cover of the power distribution box. The insert molding process for joining the stud bolt to the cover, and the additional material needed, increases the manufacturing cost of the power distribution box and prevents replacement of a broken or stripped stud bolt.

A second type of conventional power distribution box shown in FIGS. 1 and 1A provides the stud bolt 140 as a separate component for direct attachment to a portion 100 of the power distribution box. Stud bolt holding features are molded into the plastic material of the box rather than insert molding the bolt into the box. Specifically, an open-ended, three-sided slot 100*a* is formed in the plastic wall of power distribution box housing 100, for example during the molding process. Slot 100*a* is sized to receive a square-headed stud bolt 140 in a radially sliding fit from the side of the housing. Sidewalls 100*b* and recessed platform 100*c* in slot 100*a* define the final resting place for stud bolt 140, engaging it in a close friction fit on three sides of the square head to prevent rotation. A bus bar 120 is subsequently assembled in essentially permanent fashion to housing 100, with a terminal portion 120*a* lying in slot 100 over bolt 140. An aperture 120*b* in bus bar 120 fits over the threaded shank of the stud bolt to radially secure the stud bolt in position. A battery terminal 160 is subsequently secured to terminal end 120*a* of bus bar 120 by being placed over the protruding threaded shank of the stud bolt, followed by a nut (not shown) threaded onto the bolt shank and torqued to compress terminal 160 against bus bar 120.

Although the radial sliding fit of stud bolt 140 in slot 100*a* is intended to permit the removal and replacement of stud bolts stripped or broken during assembly, the essentially permanent attachment of bus bar 120 to housing 100 makes this difficult.

Another disadvantage with the stud bolt holding arrangement of FIGS. 1 and 1A is that the plastic material of housing 100 directly absorbs any heat created by electrical arcing at the stud bolt. Arcing is often caused by insufficient torque on the nut securing the terminal to the stud bolt and bus bar. This can result in damage to the housing itself.

Insufficient torque generally results from the relatively low strength offered by slot 100*a* against the tendency of stud bolt 140 to rotate as the nut is applied.

SUMMARY OF THE INVENTION

The present invention is an apparatus and method for removably securing a stud bolt to the housing of a power distribution box, junction block, or similar device. In general, the invention is a separately-formed stud bolt holder adapted to be removably secured in a receptacle in the power distribution box (PDB) housing. The stud bolt holder is preferably made from material which is more heat-resistant than the material used for the PDB housing. However, the problem of potential arcing due to insufficient torque in the nut connection of a terminal to the stud bolt is greatly reduced by the greater ability of the stud bolt holder to withstand torque than stud bolt retention features molded directly into the PDB housing.

Because the stud bolt holder can withstand greater terminal-securing torque, the stud bolt threads are preferably sized to fracture before stripping to clearly indicate a failure to the person applying the nut.

In the event that the stud bolt is stripped or fractured during assembly, the stud bolt holder is configured to allow a replacement stud bolt to function as a disassembly tool. The removability of the stud bolt holder from the PDB housing makes it easier to get at a broken stud bolt for removal, and further allows the stud bolt holder itself to be replaced if damaged during assembly or by subsequent arcing at the terminal.

In carrying out this invention in an illustrative embodiment thereof, a stud bolt holder is sized to fit into an opening in a PDB housing under a bus bar contact plate. The holder is first inserted into the opening in the PDB housing from an underside of the housing. Latch projections in the opening mate with the exterior of the holder to removably secure the holder in the housing. The stud bolt is inserted shank first into the holder until the bolt head is locked in place by a set of resilient internal lock arms. At this point the shank extends from the holder through apertures in the bus bar and battery terminal. A nut is then threaded onto the shank and tightened with sufficient torque to secure the terminal against the bus bar in a reliable electrical connection.

If the stud bolt is stripped or fractured during assembly, another stud bolt can be inserted head first into the stud bolt holder until it abuts the head of the broken stud bolt. The internal lock arms in the holder are designed to be forced out of locking engagement with the broken stud bolt head by the replacement stud bolt head, such that a tap on the protruding shank of the broken stud bolt is sufficient to knock both the broken stud bolt and the replacement stud bolt out of the stud bolt holder.

These and other features and advantages of the invention will become apparent upon a further reading of the specification in light of the accompanying drawings.

DETAILED DESCRIPTION OF THE INVENTION

Figure 1:
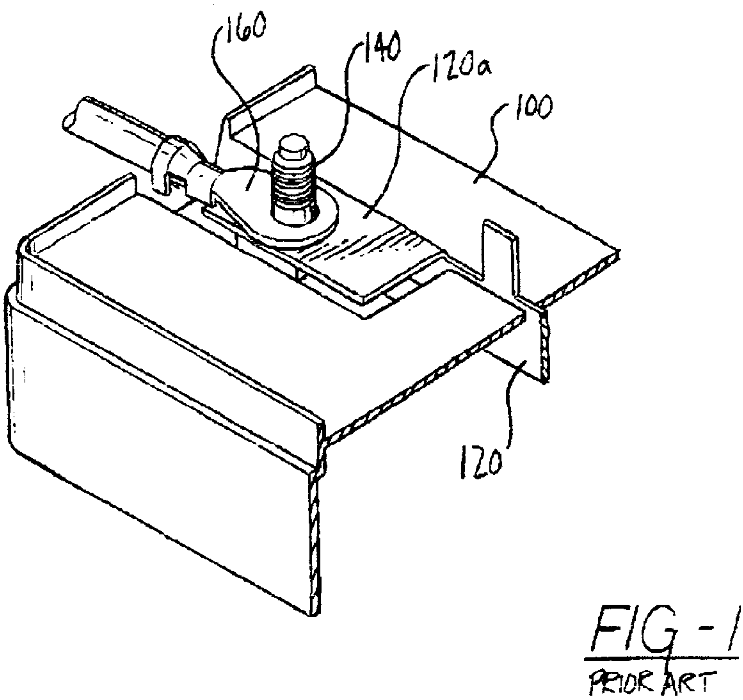
FIG-1 PRIOR ART
FIG. 1 is a perspective view of an assembly in which a stud bolt is secured to a PDB in a manner according to the prior art.
Figure 1A:
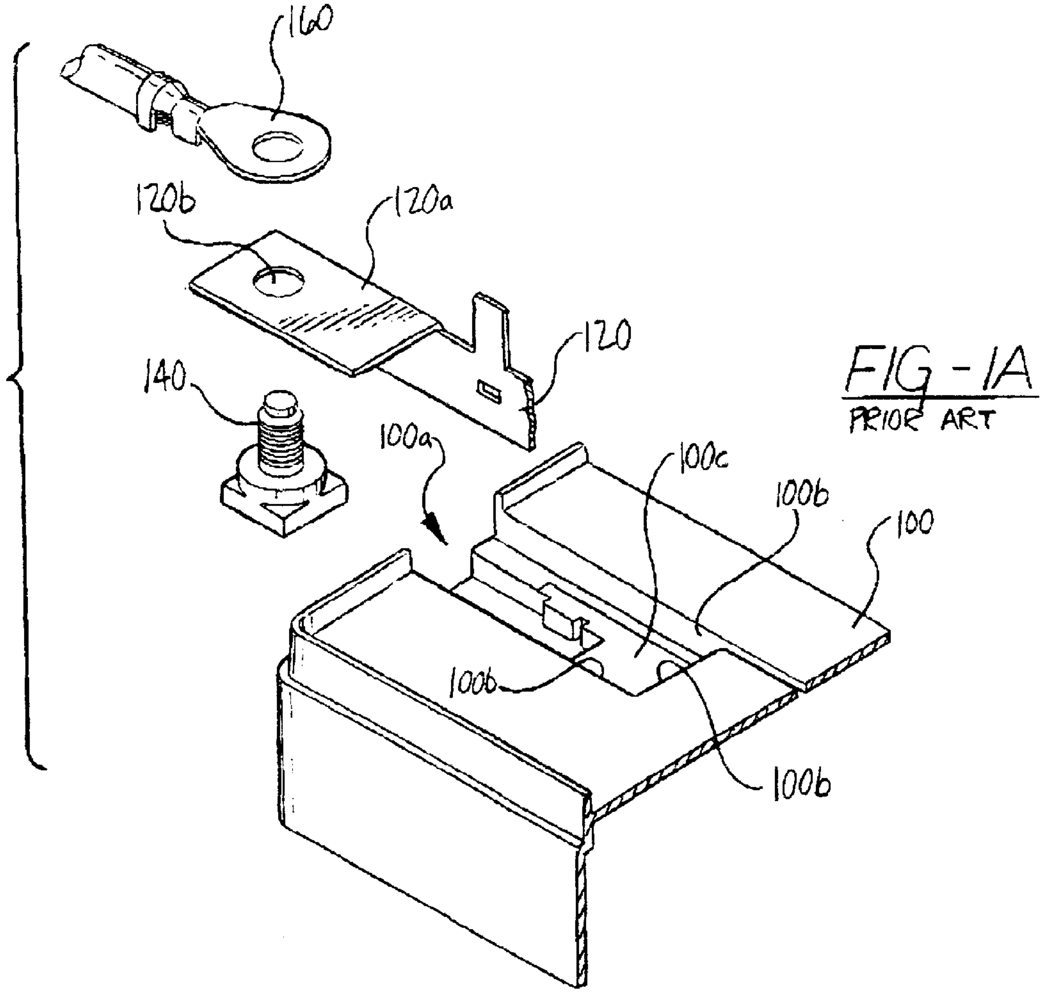
FIG-1A PRIOR ART
FIG. 1A is an exploded view of the components in FIG. 1.
Figure 2:
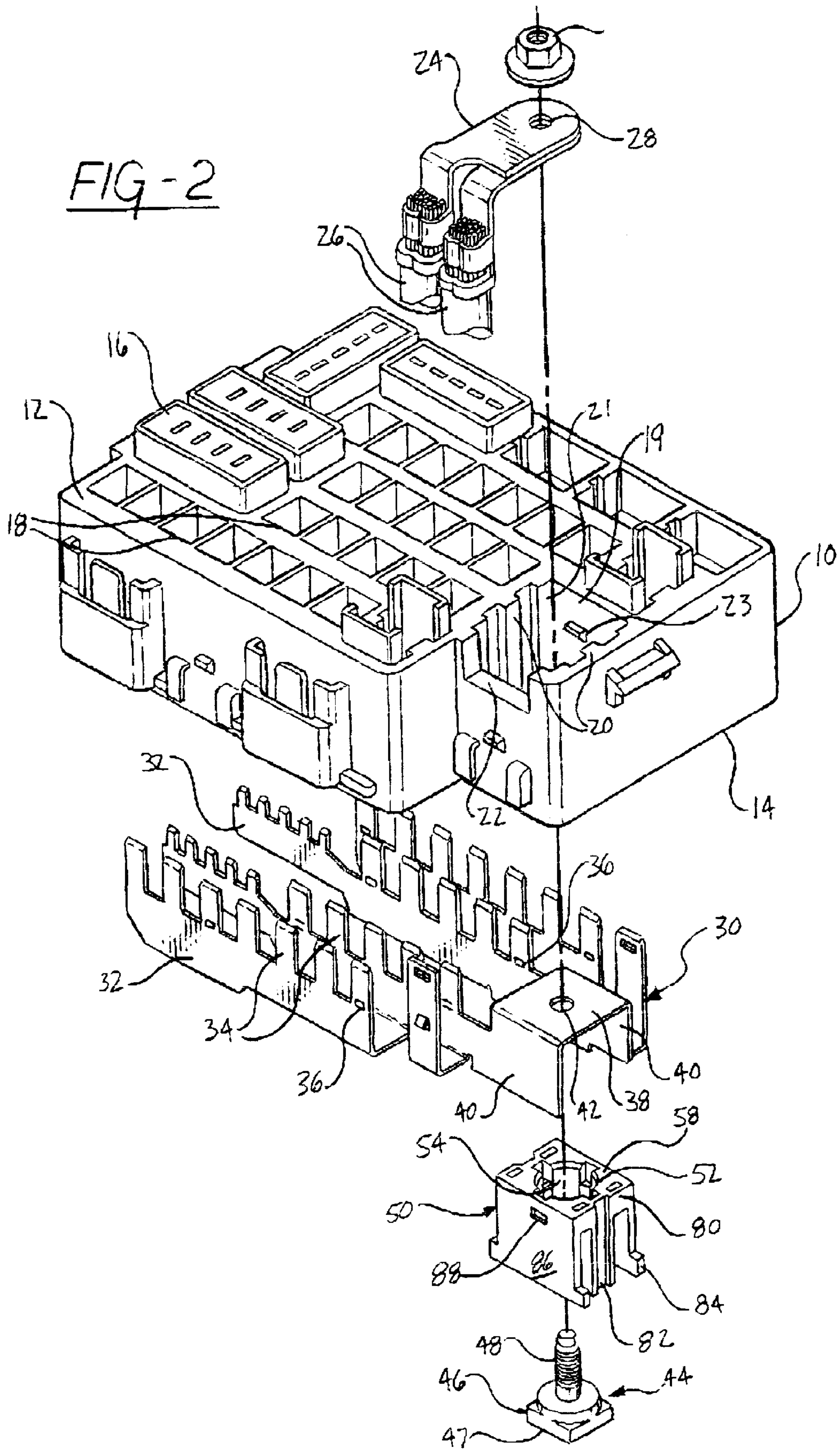
FIG. 2 is an exploded perspective view of a power distribution box and stud bolt holder according to the present invention.

Referring to FIG. 2, a power distribution box (PDB) assembly is illustrated. The assembly includes a molded plastic housing 10 having an upper side 12 and an underside 14. The upper side 12 includes typical structure such as mini-fuse receptacles 16 and cavities 18 for larger fuses, relays and other known electrical components and connectors. The housing also includes a stud bolt receptacle 19 extending from underside 14 to upper side 12. Stud bolt receptacle 19 includes a recessed shelf 22 serving as a rest or support for an electrical terminal 24 electrically connected to the ends of power supply cables 26 from a vehicle battery. Power cables 26 provide electrical power through terminal 24 to the electrical components mounted in the PDB receptacles and cavities, typically through a bus bar or similar conductor mounted in the PDB housing.

One such bus bar is illustrated at 30. The bus bar is typically stamped or otherwise formed from conductive metal, with supporting male terminal blades 34. Female-female terminals of known type (not shown) secured in the housing cavities receive male terminal blades 34 to connect the bus bar with male contacts from the electrical components. Apertures 36 located throughout the bus bar mate with locking projections of known type (not shown) in the housing to secure the bus bar in the housing.

It will be understood by those skilled in the art that the illustrated power distribution box and bus bar arrangement is merely a representative example, and that the stud bolt holder invention described below can be used with virtually any PDB/bus bar configuration employing a power terminal designed to be connected to the bus bar with a bolt.

It will also be understood that terms of orientation such as "upper side" and "underside" are used for convenient reference, and are not intended to limit the ultimate orientation of the components when assembled and placed in a vehicle.

The term "stud bolt" is a common term in the industry for the style of bolt illustrated, but is intended herein to encompass any bolt or stud capable of being used to secure a bus bar or similar PDB conductor to a battery terminal.

To power the components, and to prevent arcing, electrical terminal 24 needs to be securely connected to bus bar 30. The bus bar accordingly includes a flat area or plate 38 adapted to receive terminal 24 in a mating electrical connection. Plate 38 and terminal 24 include aligned stud bolt apertures 42, 28. When the bus bar is inserted into the housing from underside 14, the plate 38 is pushed up through receptacle 19 to a final position substantially level with shelf 22. Plate 38 thus provides a stable contact surface for terminal 24.

Terminal 24 is next secured to bus bar plate 38 with stud bolt 44. The illustrated stud bolt is an industry standard conductive fastener having a four-sided square head 46 with a flat top face 47 and a threaded shank 48. Stud bolt 44 is retained in an inventive holder 50 which is used to position and hold bolt 44 within housing 10. The holder has a body made from an electrically non-conductive, flame-retardant and heat-resistant plastic material.

Figure 3:
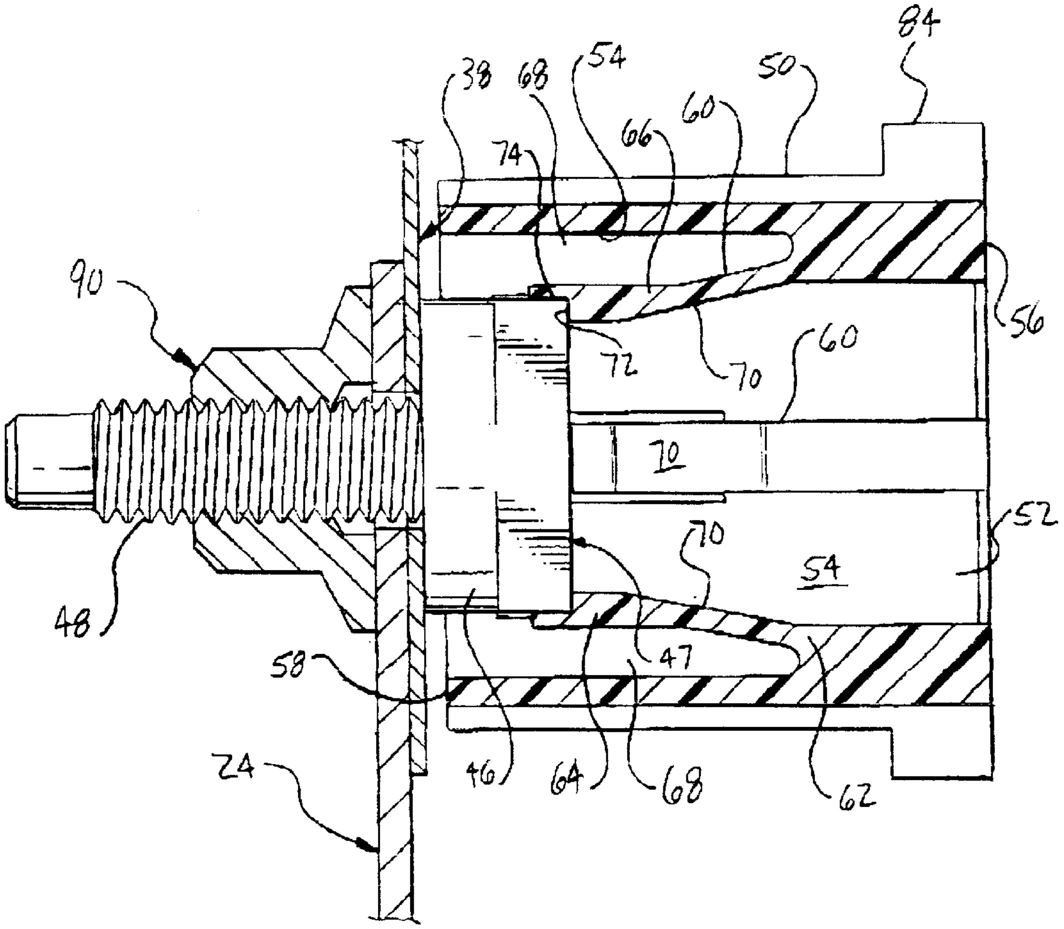
FIG. 3 is a side elevation view, in section, of the stud bolt holder and stud bolt of FIG. 2.

As best shown in FIG. 3, the holder has a bolt-receiving passage or receptacle 52 extending between bolt insertion end 56 and terminal end 58. Passage 52 is sized and shaped to closely receive square head 46 of the stud bolt in an axial sliding fit, and to prevent head 46 from rotating when a nut is threaded onto shank 48 and torqued in place. For this purpose, passage 52 is preferably square, although other shapes can be used.

Restraining arms 60 extend from the interior walls 54 of holder 50, from base ends 62 integrally joining the arms to the interior walls adjacent bolt insertion end 56 of the holder, to free ends 64 near the terminal end 58 of the holder. Each arm has an intermediate portion 66 spaced from the interior wall of the holder by a gap 68. Each arm further includes a cam surface 70 sloped or inclined from base portion 62 to free end 64 in a direction angled toward the stud bolt. Each cam surface ends in a notch or seat for receiving the top face 47 of the bolt head after the bolt head has been pushed past surface 70. The illustrated seat is defined by two surfaces 72 and 74 extending generally at right angles to one another, although the configuration of the seat can vary according to the shape of the bolt head.

In the illustrated embodiment of FIG. 2, holder 50 is generally rectangular with four exterior sides and is adapted to be secured in stud bolt holder receptacle 19 in a mechanical snap-fit. For example, two opposite sides 80 of the holder are illustrated with a central groove 82 extending the length of the holder. The sides 80 include feet 84 at the bolt insertion end 56, protruding from each corner. Remaining sides 86 have locking indentations 88. To secure holder 50 in housing 10, some or all of the feet 84 of the holder are gripped by the assembler. The upper, terminal end 58 of the holder is inserted into receptacle 19 at the underside 14 of the housing. Grooves 82 in the holder receive guides 20 from receptacle 19, ensuring proper alignment and smooth, stable sliding insertion. When holder 50 is completely inserted in receptacle 19 as illustrated in FIG. 3, the holder locking indentations 88 receive the housing latch projections 23 and the holder is locked in the housing. However, the lock can be released and the holder removed from the housing by applying a firm pulling force on feet 84.

Stud bolt 44 is inserted shank first through bolt insertion end 56 of the holder. Bolt head 46 contacts cam surfaces 70 of the arms 60, forcing the arms apart toward the interior wall 54 of the holder. When the top face 47 of the bolt head reaches the seat surface 72, the arms snap or flex back inwardly until their seat surfaces 74 contact respective sides of the bolt head. The seat surfaces 72 and 74 thereby axially and radially engage the bolt head with shank 48 extending from the terminal end of the holder. In the illustrated embodiment, each of the four sides of the bolt head is held by an arm 60.

The stud bolt may be secured in holder 50 before or after the holder is secured to the PDB housing.

With the stud bolt fully inserted and secured in the holder, and the holder secured in the PDB housing, stud bolt shank 48 extends through aperture 42 in the bus bar plate 38 and aperture 28 in the electrical terminal 24 (FIG. 3). A nut 90 is then threaded onto the bolt shank to tighten terminal 24 on plate 38, securing the parts together and establishing a reliable electrical connection.

The threads on shank 48 of the stud bolt are preferably selected, along with the size and material of the shank itself, to fracture before stripping in the event of over-torque. This provides a clear indication to the assembler that the terminal connection is broken or faulty, ensuring prompt replacement on the assembly line.

In the event of a fracture of the stud bolt shank 48, stud bolt head 46 remains locked in holder 50.

Figure 4:
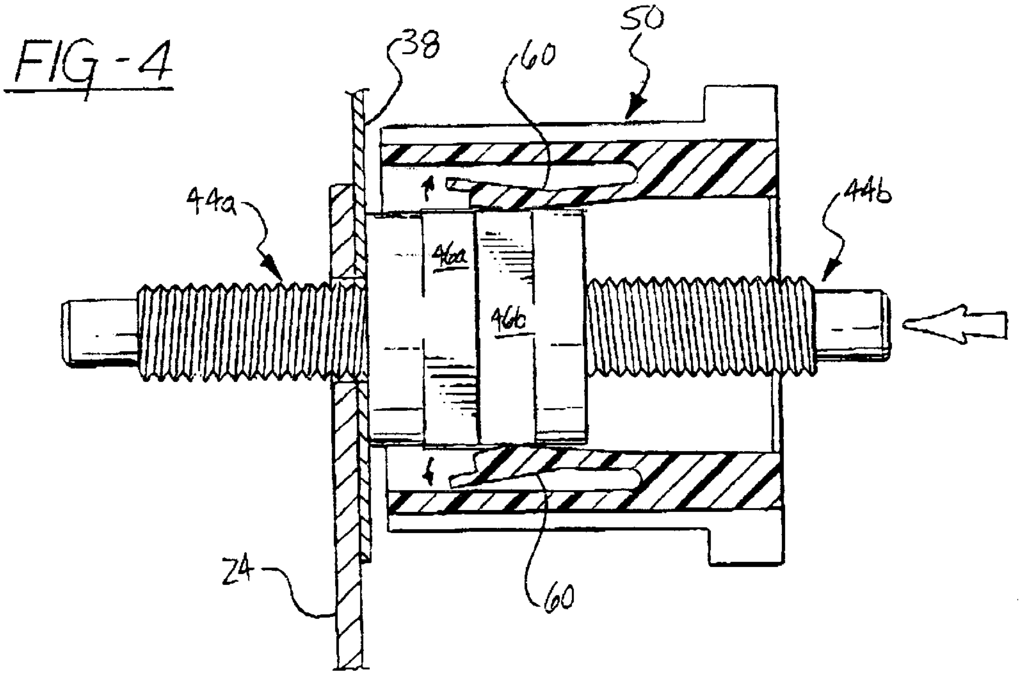
FIGS. 4 and 5 show the stud bolt holder of FIG. 3 being unlocked and a broken stud bolt removed using a replacement stud bolt as a disassembly tool.
Figure 5:
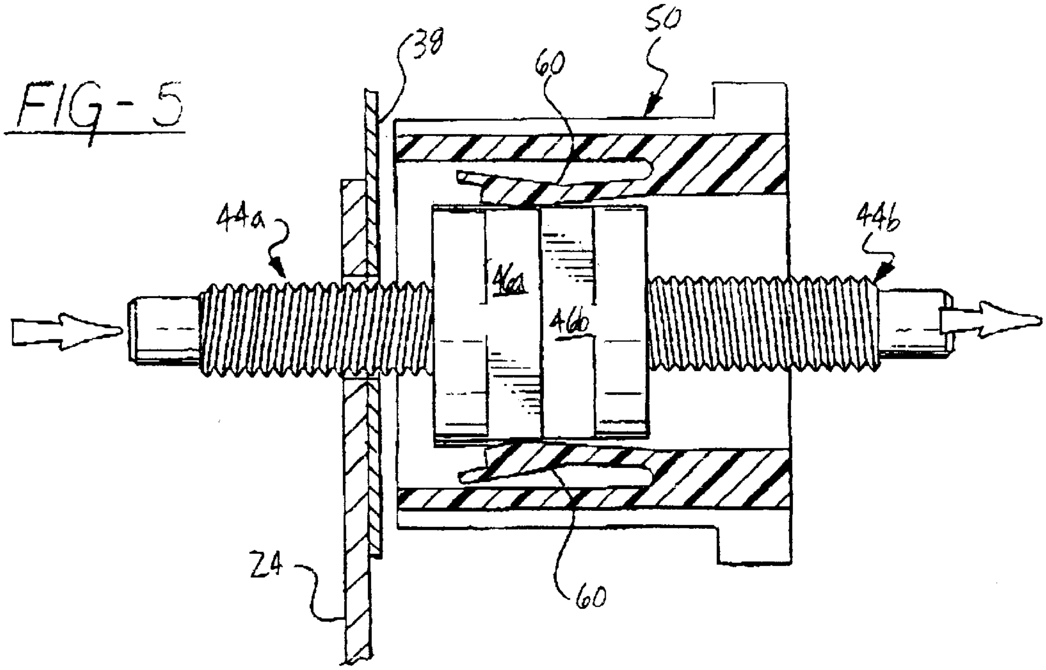

Stud bolt holder 50 is designed to permit rapid removal of a broken or stripped stud bolt from the locked position using nothing more than a replacement stud bolt as a disassembly tool. Referring to FIGS. 4 and 5, broken stud bolt **44*a* is shown being removed using a replacement stud bolt 44*b*. Replacement stud bolt 44*b* is inserted head first (rather than shank first) into bolt insertion end 56 of the holder, until it abuts the face of broken stud bolt 44*a***. In doing so, the head 46*b* of replacement bolt 44*b* forces arms 60 apart, thereby releasing the holder's locking connection on the broken stud bolt head 46*a*. A tap or push on the end of the shank portion of broken stud bolt 44*a* is sufficient to push both the broken and replacement bolts back out of the holder through bolt insertion end 56 as best shown in FIG. 5. Replacement stud bolt 44*b* can then be inserted shank first (rather than head first) back into the holder as shown in FIG. 3 to allow the electrical connection with the bus bar and battery terminal to be completed.

Although the illustrated embodiment shows the removal of a broken stud bolt from the holder being accomplished with a replacement stud bolt, it will be apparent that removal of the broken bolt could be achieved with a variety of tools. However, use of a replacement bolt as a disassembly tool is highly preferred.

The stud bolt holder 50 allows easy assembly of the power distribution box. Since the arms 60 and the four interior walls of passage 52 hold all four sides of the stud bolt head, the holder readily withstands the torque forces generated when tightening the nut. If the terminal 24 is poorly or incorrectly secured on the housing, arcing will melt rather than ignite the flame retardant material of the holder, which can then be easily replaced without damage to the PDB housing. If the bolt shank is stripped or broken, the bolt is easily replaced using a replacement bolt as the tool.

Since minor changes and modifications varied to fit particular operating requirements and environments will be understood by those skilled in the art, this invention is not considered limited to the specific examples chosen for purposes of illustration. For example, the stud bolt holder receptacle, the stud bolt holder, and the stud bolt head need not be square or rectangular as shown. The exact nature of the mechanical connection of the stud bolt holder to the PDB housing is not limited to the specific example shown, but can be achieved with a variety of cooperating structures and attachment methods known to those skilled in the art. The structure used in the holder to secure the stud bolt head can also vary provided that the stud bolt head is locked in place upon insertion, is prevented from rotating under torque from a nut, and is capable of being disengaged from the bolt head for replacement, preferably by using the head of a replacement bolt as a disassembly tool. These and other changes will be readily apparent to those skilled in the art in order to adapt the invention to a variety of power distributions box housings and bus bar conductor arrangements.

I claim:

1. In a power distribution box (PDB) having a housing with a bolt-type terminal connection, an improved holding apparatus for a terminal bolt comprising:

a non-conductive bolt holder receptacle in the PDB housing in association with a conductive bolt-type busbar terminal connection;

a separate non-conductive bolt holder removably connected to the PDB housing in the bolt holder receptacle; and a terminal bolt removably secured in the bolt holder in a terminal-engaging position in which a shank of the bolt extends through the busbar terminal connection when the bolt holder is in the bolt holder receptacle, the bolt holder including internal lock means for removably locking the bolt in the terminal-engaging position and for releasing the bolt independently of the connection between the bolt holder and the bolt holder receptacle in the PDB housing.

2. The apparatus of claim 1, wherein the bolt holder is made from a non-conductive material which is more resistant to the effects of heat than the non-conductive material of the bolt holder receptacle.

3. The apparatus of claim 1, wherein the bolt holder includes lock means for removably locking a head portion of the bolt in the terminal-engaging position while a shank portion of the bolt protrudes from the holder.

4. The apparatus of claim 3, wherein the lock means comprises a plurality of resilient lock arms extending from a bolt insertion end of the housing toward a terminal end of the housing, and which when engaged with the head of a first bolt at the terminal end of the holder provide camming surfaces located such that the head of a second bolt inserted head first into the holder from the bolt insertion end forces the resilient lock arms out of locking engagement with the first bolt head and maintains the lock arms out of locking engagement with the first bolt head such that the first bolt can be driven from the terminal end of the holder out through the bolt insertion end.

5. The apparatus of claim 3, wherein the bolt holder engages a peripheral portion of the bolt head to prevent rotation of the bolt head in the holder.

6. The apparatus of claim 5, wherein the bolt head periphery includes a plurality of edges and the bolt holder engages each of the plurality of edges to prevent rotation of the bolt head in the holder.

7. In combination with a power distribution box, an assembly for electrically connecting a power supply to electrical components mounted on or in the power distribution box, the assembly comprising:

a bus bar mounted on the power distribution box and in electrical contact with the electrical components, the bus bar having a portion adapted to electrically mate with a power supply terminal;

a power supply terminal electrically connected to an external source of power;

a non-conductive bolt holder connectable to and separable from the power distribution box independently of the busbar and having means for restraining a bolt within the power distribution box such that a shank of the bolt extends through the bus bar portion and electrical terminal, the bolt further being separable from and replaceable in the bolt holder while the bolt holder is connected to the power distribution box; and a nut for securing the terminal to the bolt shank and against the bus bar.

8. The assembly of claim 7, wherein the restraining means comprises at least one deflectable lock arm within the bolt holder engaging a head of the bolt adjacent a terminal end of the bolt holder.

9. The assembly of claim 8, wherein the bolt holder has a bolt insertion end, and the lock arm is angled inwardly from the bolt insertion end to the terminal end to admit a bolt head inserted from the bolt insertion end toward the terminal end and to lock the bolt head in position at the terminal end, the lock arm further being dimensioned to allow a second bolt head to be inserted into the bolt holder from the bolt insertion end to a point forcing the lock arm out of locking engagement with the first inserted bolt head, thereby allowing both bolts to be removed from the bolt holder.

10. The apparatus of claim 8, wherein the bolt head includes a plurality of sides, and the bolt holder includes a lock arm for each side of the bolt head.

11. A method for securing a terminal bolt in a power distribution box in secure electrical connection with a terminal and a bus bar, comprising the following steps:

providing a bolt holder formed separately from the power distribution box and bus bar;

inserting a bolt into the bolt holder with a shank portion of the bolt protruding from the holder;

inserting the bolt holder into a mating receptacle in the power distribution box such that the shank portion of the bolt extends through the terminal and the bus bar; and securing the terminal to the bus bar by applying a nut to the bolt shank.

12. In a power distribution box (PDB) having a housing and an electrically conductive bus bar in the housing for electrical engagement with a bolt-type terminal connection, an improved holding apparatus for a terminal bolt comprising:

a bolt holder receptacle in the PDB housing in association with the bus bar and bolt-type terminal connection;

a bolt holder separate from the bus bar and made from an electrically non-conductive, heat-resistant material, the holder being removably connected to the PDB housing in the bolt holder receptacle; and a terminal bolt removably secured in the bolt holder in a terminal engaging position, the bolt holder being adapted to release the bolt independently of the connection between the bolt holder and the PDB housing.

* * * * *